US010977813B2

(12) United States Patent
Trajkovic et al.

(10) Patent No.: US 10,977,813 B2
(45) Date of Patent: Apr. 13, 2021

(54) SYSTEM AND METHOD FOR ROBUST DEPTH CALCULATION WITH TOF SENSORS USING MULTIPLE EXPOSURE TIMES

(71) Applicant: ZEBRA TECHNOLOGIES CORPORATION, Lincolnshire, IL (US)

(72) Inventors: Miroslav Trajkovic, Setauket, NY (US); Adithya H. Krishnamurthy, Hicksville, NY (US); Bryn P. Martino, Commack, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/537,294

(22) Filed: Aug. 9, 2019

(65) Prior Publication Data
US 2021/0042982 A1 Feb. 11, 2021

(51) Int. Cl.
*G06T 7/50* (2017.01)
*G06T 15/00* (2011.01)
(Continued)

(52) U.S. Cl.
CPC ............... *G06T 7/50* (2017.01); *G01S 7/51* (2013.01); *G01S 17/42* (2013.01); *G06T 15/00* (2013.01);
(Continued)

(58) Field of Classification Search
CPC ....... G06T 15/00; G06T 7/50; G06T 2200/24; G06T 2207/10028; G06T 2207/10144;
(Continued)

(56) References Cited

U.S. PATENT DOCUMENTS 9,715,232 B1 * 7/2017 Fischer ................ G05D 1/0231
2015/0160340 A1 * 6/2015 Grauer ..................... G01S 7/486
356/5.04

(Continued)

OTHER PUBLICATIONS

International Search Report and Written Opinion for International Application No. PCT/US2020/45314 dated Sep. 4, 2020.

*Primary Examiner* — Daniel F Hajnik
(74) *Attorney, Agent, or Firm* — Yuri Astvatsaturov

(57) ABSTRACT

A system and method for performing robust depth calculations with time of flight (ToF) sensors using multiple exposure times is disclosed. A three-dimensional (3D) depth sensor assembly captures a first array of n point values, where each point value of the first array has a respective first-array depth component and a respective first-array quality component. The 3D depth sensor assembly then captures a second array of n point values, where each point value of the second array has a respective second-array depth component and a respective second-array quality component. A processor then renders a 3D point cloud comprising a third array of n point values, where each point value of the third array has a respective third-array depth component. The respective third-array depth component for each point value of the third array is based on either the corresponding respective first-array depth component or the corresponding respective second-array depth component.

11 Claims, 9 Drawing Sheets

(51) Int. Cl.
*G01S 17/42* (2006.01)
*G01S 7/51* (2006.01)

(52) U.S. Cl.
CPC ............... *G06T 2200/24* (2013.01); *G06T 2207/10028* (2013.01); *G06T 2207/10144* (2013.01); *G06T 2207/30168* (2013.01)

(58) Field of Classification Search
CPC .. G06T 2207/30168; G01S 7/51; G01S 17/42
See application file for complete search history.

(56) References Cited

U.S. PATENT DOCUMENTS

2018/0232947 A1\* 8/2018 Nehmadi ............... G01S 17/931
2018/0374227 A1\* 12/2018 Varekamp ............... G01S 17/86

\* cited by examiner

US 10,977,813 B2

SYSTEM AND METHOD FOR ROBUST DEPTH CALCULATION WITH TOF SENSORS USING MULTIPLE EXPOSURE TIMES

BACKGROUND OF THE INVENTION

In commercial trailer loading, often Time of Flight (ToF) sensors are used to determine loading metrics. However, when acquiring three-dimensional (3D) images using ToF sensors, a high range of depths in the ToF sensors' field of view (FOV) can pose a serious problem for measurement accuracy. Typically, this results in saturation of part of a scene (e.g., the part closest to the sensors), a lack of depth data for parts of the scene disposed further from the sensors, or both. Conventional methods use an auto-exposure feature in an attempt to determine the optimal exposure time, but this method has significant drawbacks.

Accordingly, there is a need for a trailer monitoring unit that can perform accurate depth calculations without the use of a single exposure length auto-exposure feature.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
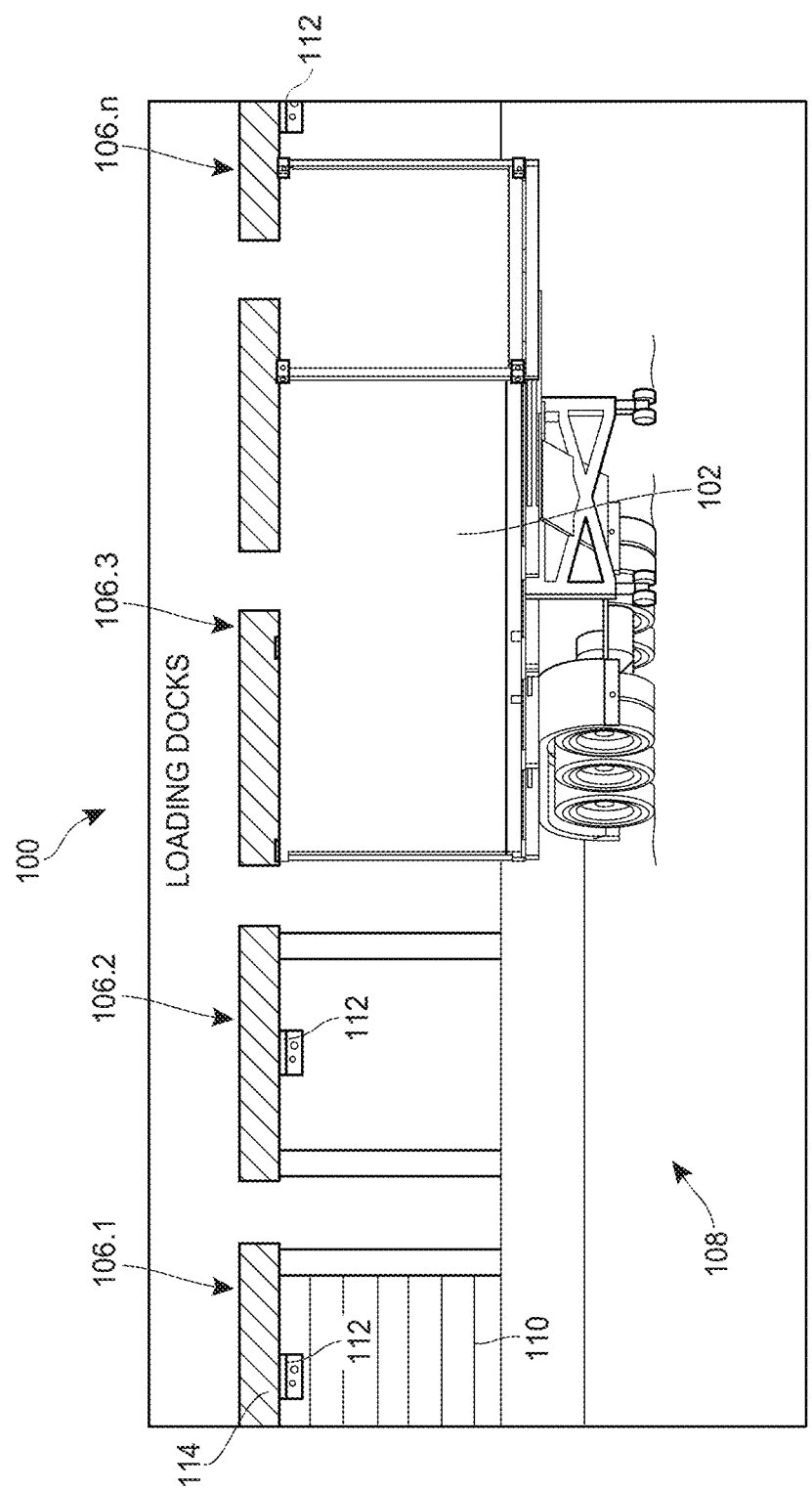
FIG. 1 illustrates a loading facility, in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As used herein, the term "container" shall refer to any container transportable by at least one of a vehicle, a train, a marine vessel, and airplane, and configured to store transportable goods such as boxed and/or unboxed items and/or other types of freight. Accordingly, an example of a container includes an enclosed container fixedly attached to a platform with wheels and a hitch for towing by a powered vehicle. An example of a container also includes an enclosed container removably attached to a platform with wheels and a hitch for towing by a powered vehicle. An example of a container also includes an enclosure that is fixedly attached to a frame of a powered vehicle, such as the case may be with a delivery truck, box truck, etc. As such, while the exemplary embodiment(s) described below may appear to reference one kind of a container, the scope of the invention shall extend to other kinds of container, as defined above. Furthermore, the term "trailer" is an example of application of a container, in particular, a container used with a vehicle, such as a powered vehicle, like a delivery truck, box truck, etc.

In an embodiment, the present invention is a method for performing robust depth calculations with ToF sensors using multiple exposure times. The method includes capturing, by a 3D depth sensor assembly, configured with a first set of capture-parameters, a first array of n point values, each point value of the first array having a respective first-array depth component and a respective first-array quality component; capturing, by the 3D depth sensor assembly, configured with a second set of capture-parameters, a second array of n point values, each point value of the second array having a respective second-array depth component and a respective second-array quality component; and rendering, by a processor, a 3D point cloud comprising a third array of n point values, each point value of the third array having a respective third-array depth component, wherein n is an integer, wherein i is an integer ranging from 1 to n, and wherein, for each $i^{th}$ point value of the third array, the respective third-array depth component is based on the respective first-array depth component of $i^{th}$ point value of the first array when the respective first-array quality component of the $i^{th}$ point value of the first array is within a predetermined quality threshold, and the respective third-array depth component is based on the respective second-array depth component of $i^{th}$ point value of the first array when the respective first-array quality component of the $i^{th}$ point value of the first array is not within a predetermined quality threshold.

In another embodiment, the present invention is a method for performing robust depth calculations with ToF sensors using multiple exposure times. The method includes capturing, by a 3D depth sensor assembly, a plurality of point arrays, each of the plurality of point arrays being captured with the 3D depth sensor assembly being configured with a respective set of capture-parameters that is different from any other set of capture-parameters used to capture each other of the plurality of point arrays, each of the plurality of point arrays having n point values, each of the n point values of each of the plurality of point arrays having a respective depth component and a respective quality component; and rendering, by a processor, a 3D point cloud comprising a rendered array of n point values, each point value of the rendered array having a respective rendered-array depth component, wherein n is an integer, wherein i is an integer ranging from 1 to n, and wherein, for each $i^{th}$ point value of the rendered array, the operation of rendering the 3D point cloud includes: (a) determining if the respective quality component of $i^{th}$ point value of one of the plurality of point arrays is within a predetermined quality threshold; (b) responsive to the respective quality component of the $i^{th}$ point value of the one of the plurality of point arrays being within the predetermined quality threshold, basing the respective rendered-array depth component on the respective depth component of the $i^{th}$ point value of the one of the plurality of point arrays; and (c) responsive to the respective quality component of the $i^{th}$ point value of the one of the plurality of point arrays being outside the predetermined quality threshold, repeating steps (a)-(c) such that the one of the plurality of point arrays is replaced with another one of the plurality of point arrays.

In another embodiment, the present invention is a method for performing robust depth calculations with ToF sensors using multiple exposure times. The method includes capturing, by a 3D depth sensor assembly, a first plurality of points and a second plurality of points, wherein each point of the first plurality of points includes a first respective quality component and a first respective depth component, and wherein each point of the second plurality of points includes a second respective quality component and a second respective depth component; rendering, by one or more processors, a first 3D point cloud containing the first plurality of points, and a second 3D point cloud containing the second plurality of points; determining, by the one or more processors, whether the first respective quality component is within a threshold range for each point in the first plurality of points; and generating, by the one or more processors, a rendered point cloud from the first 3D point cloud and second 3D point cloud by at least: for each first respective point in the first plurality of points, storing, by the one or more processors, the first respective point in the rendered point cloud if the first respective quality component is within the threshold range; and for each second respective point in the second plurality of points corresponding to the first respective point in the first plurality of points, storing, by the one or more processors, the second respective point in the rendered point cloud if the first respective quality component associated with the first respective point is outside the threshold range.

In another embodiment, the present invention is a system for performing robust depth calculations with ToF sensors using multiple exposure times. The system includes a user interface; a trailer monitoring unit (TMU) mounted proximate a loading bay and communicatively connected with the user interface, the TMU including: a housing; and a three-dimensional (3D) depth sensor assembly at least partially within the housing and configured to capture a first plurality of points and a second plurality of points, wherein each point of the first plurality of points includes a first respective quality component and a first respective depth component, and wherein each point of the second plurality of points includes a second respective quality component and a second respective depth component; wherein the TMU is configured to: render a first 3D point cloud containing the first plurality of points, and a second 3D point cloud containing the second plurality of points; determine whether the first respective quality component is within a threshold range for each point in the first plurality of points; and generate a rendered point cloud from the first 3D point cloud and second 3D point cloud by at least: for each first respective point in the first plurality of points, store, by the one or more processors, the first respective point in the rendered point cloud if the first respective quality component is within the threshold range; and for each second respective point in the second plurality of points corresponding to the first respective point in the first plurality of points, store, by the one or more processors, the second respective point in the rendered point cloud if the first respective quality component associated with the first respective point is outside the threshold range.

In another embodiment, the present invention is a system for performing robust depth calculations with ToF sensors using multiple exposure times. The system includes a user interface; a trailer monitoring unit (TMU) mounted proximate a loading bay and communicatively connected with the user interface, the TMU including: a housing; and a three-dimensional (3D) depth sensor assembly at least partially within the housing and configured to capture a plurality of point arrays, each of the plurality of point arrays being captured with the 3D depth sensor assembly being configured with a respective set of capture-parameters that is different from any other set of capture-parameters used to capture each other of the plurality of point arrays, each of the plurality of point arrays having n point values, each of the n point values of each of the plurality of point arrays having a respective depth component and a respective quality component; wherein the TMU is configured to: render a 3D point cloud comprising a rendered array of n point values, each point value of the rendered array having a respective rendered-array depth component, wherein n is an integer, wherein i is an integer ranging from 1 to n, and wherein, for each $i^{th}$ point value of the rendered array, the operation of rendering the 3D point cloud includes: (a) determining if the respective quality component of the $i^{th}$ point value of one of the plurality of point arrays is within a predetermined quality threshold; (b) responsive to the respective quality component of the $i^{th}$ point value of the one of the plurality of point arrays being within the predetermined quality threshold, basing the respective rendered-array depth component on the respective depth component of the $i^{th}$ point value of the one of the plurality of point arrays; and (c) responsive to the respective quality component of the $i^{th}$ point value of the one of the plurality of point arrays being outside the predetermined quality threshold, repeating steps (a)-(c) such that the one of the plurality of point arrays is replaced with another one of the plurality of point arrays.

Referring now to the drawings, FIG. 1 illustrates an exemplary environment where embodiments of the present invention may be implemented. In the present example, the environment is provided in a form of a loading dock 100 (also referred to as a loading facility) where containers 102 are loaded with various goods and/or where various goods are unloaded from the containers 102. The loading dock 100 is comprised of a facility 104 having a plurality of loading bays 106.1-106.n facing a loading facility lot 108 where vehicles, such as semis (not shown), deliver and pick up containers 102. To be loaded, each trailer 102 is backed toward the facility 104 such that it is generally perpendicular with the wall having the plurality of loading bays 106.1-

106.*n*, and in line with one of the loading bays (in this case 106.3). As illustrated, each respective loading bay of the plurality of loading bays 106.1-106.*n* includes a bay door 110 that can be lowered to close the respective loading bay or raised to open the respective loading bay allowing the interior of the facility 104 to be accessible therethrough. Additionally, each respective loading bay is provided with a respective TMU 112. The respective TMU 112 is mounted near the trailer 102 loading area, preferably in the upper section of the respective loading bay outside the door 110 facing the loading facility lot 108 or an interior/rear of a trailer 102 if one is docked at the respective loading bay. To protect the respective TMU 112 from inclement weather, it could be mounted under a bay awning 114. Once docked, goods can be loaded onto/unloaded from the trailer 102 with the respective TMU 112 maintaining a view of the rear/inside of the trailer 102. In various embodiments, the trailer 102 may be in a drop-frame configuration or a straight-rail configuration.

Figure 2:
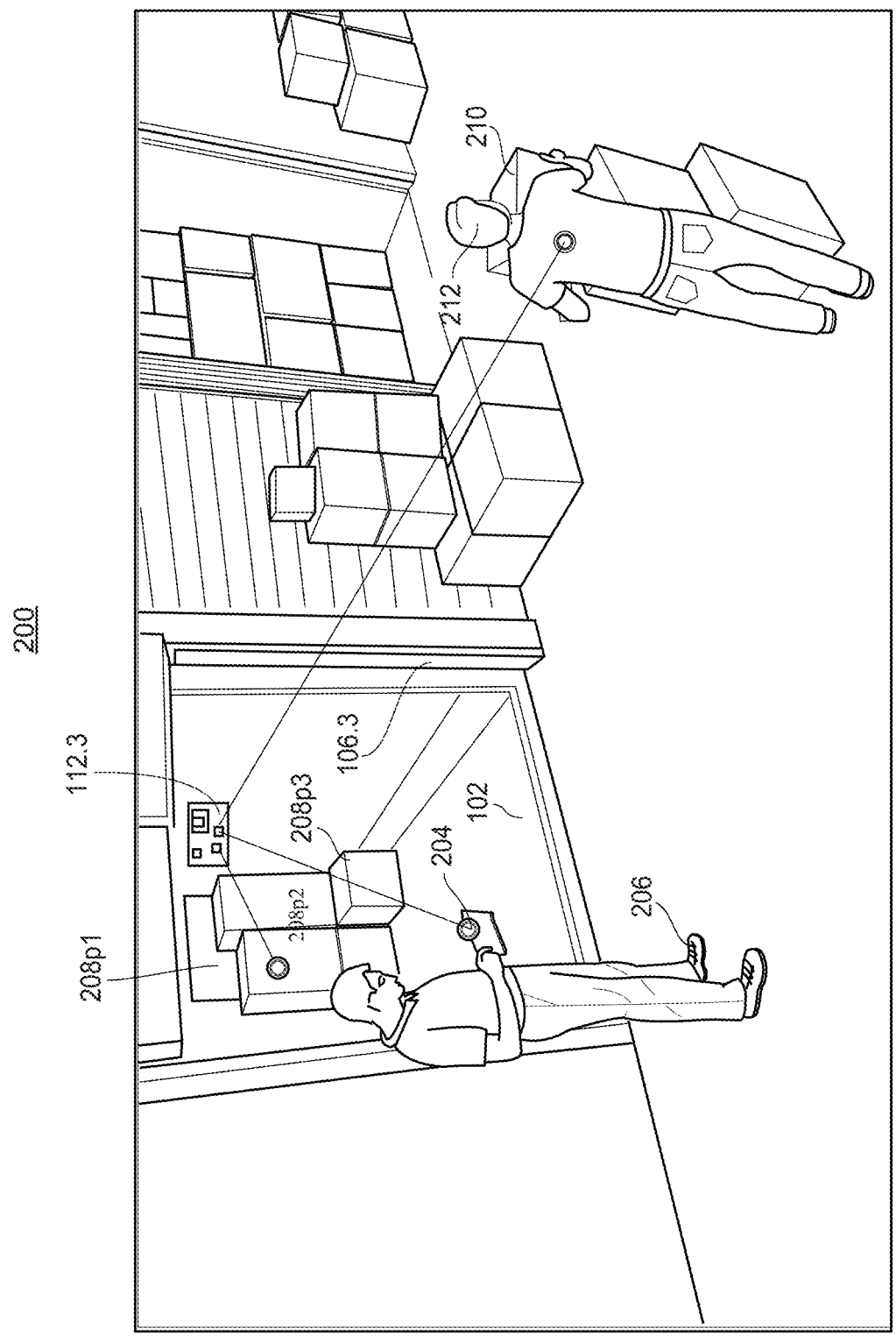
FIG. 2 illustrates an interior of the loading facility of FIG. 1.

FIG. 2 is a perspective view 200 of the loading facility 100 of FIG. 1 depicting trailer 102 docked at a loading bay 106.3, in accordance with example embodiments herein. For example, FIG. 2 depicts trailer 102, which in the embodiment of FIG. 2 is an interior view of the trailer 102 of FIG. 1. FIG. 2 also depicts loading bay 106.3, which in the embodiment of FIG. 2 is an interior view of the loading bay 106.3 of FIG. 1. As depicted in FIG. 2, trailer 102 is docked with loading bay 106.3 exposing the interior of trailer 102 to the interior of loading facility 100. Trailer 102 includes packages, boxes, and/or other transportable objects or goods, including packages $208p1$-$208p3$. The packages $208p1$-$208p3$ may be in a state of being loaded or unloaded into trailer 102. For example, worker 212 may be in a state of loading or unloading additional packages 210 into or out of trailer 102. In some embodiments, manager 206 may oversee, assist, or otherwise additionally facilitate the loading or unloading packages, boxes, and/or other transportable objects or goods (e.g., packages $208p1$-$208p3$ or 210) into or out of the trailer 102. For example, manager 206 may utilize a dashboard app executing on client device 204 as described herein.

FIG. 2 also depicts a TMU 112.3. TMU 112.3 may include one or more processors and one or more computer memories for storing image data, and/or for executing apps that perform analytics or other functions as described herein. In various embodiments, and as shown in FIG. 2, the TMU 112.3 may be mounted within loading facility 100 and oriented in the direction of trailer 102 to capture 3D and/or 2D image data of the interior of trailer 102. For example, as shown in FIG. 2, TMU 112.3 may be oriented such that the 3D and 2D cameras of TMU 112.3 look down the length of the trailer 102 so that TMU 112.3 may scan or sense the walls, floor, ceiling, packages (e.g., $208p1$-$208p3$ or 210), or other objects or surfaces with trailer 102 to determine the 3D and 2D image data. The image data may be processed by the one or more processors and/or memories of the TMU 112.3 (or, in some embodiments, one or more remote processors and/or memories of a server) to implement analysis, functions, such as graphical or imaging analytics, as described by the one or more various flowcharts, block diagrams, methods, functions, or various embodiments herein.

In some embodiments, for example, the TMU 112.3 may process the 3D and 2D image data, as scanned or sensed from the 3D-depth camera and photo-realistic camera, for use by other devices (e.g., client device 204, or server 410 as further described herein). For example, the one or more processors and/or one or more memories of the TMU 112.3 may process the image data scanned or sensed from trailer 102. The processing of the image data may generate post-scanning data that may include metadata, simplified data, normalized data, result data, status data, or alert data as determined from the original scanned or sensed image data. In some embodiments, the image data and/or the post-scanning data may be sent to a client application, such as a dashboard application (app) described herein, for viewing, manipulation, or otherwise interaction. In some embodiments, the image data and/or the post-scanning data may be sent to a server (e.g., server 410 as further described herein) for storage or for further manipulation.

As shown in FIG. 2, the image data and/or the post-scanning data may be received on client device 204. Client device 204 may implement a dashboard app to receive the image data and/or the post-scanning data and display such data, e.g., in graphical or other format, to manager 206 to facilitate the unloading or loading of packages (e.g., $208p1$-$208p3$ or 210), as described herein. In some embodiments, the dashboard app may receive the image data and/or the post-scanning data and display such data in real-time. Client device 204 may be a mobile device, such as a tablet, smartphone, laptop, or other such mobile computing device. Client device 204 may also include wired or wireless transceivers for receiving image data and/or post-scanning data as described herein. Such wired or wireless transceivers may implement one or more communication protocol standards including, for example, TCP/IP, WiFi (802.11b), Bluetooth, or any other similar communication protocols or standards.

In some embodiments, the image data and/or the post-scanning data may be sent to a server, such as server 410 described herein. In such embodiments, the server may generate post-scanning data, that may include metadata, simplified data, normalized data, result data, status data, or alert data as determined from the original scanned or sensed image data provided by the TMU 112.3. As described herein, the server may store such data, and may also send the image data and/or the post-scanning data to a dashboard app, or other app, implemented on a client device, such as the dashboard app implemented on client device 204 of FIG. 2.

Figure 3:
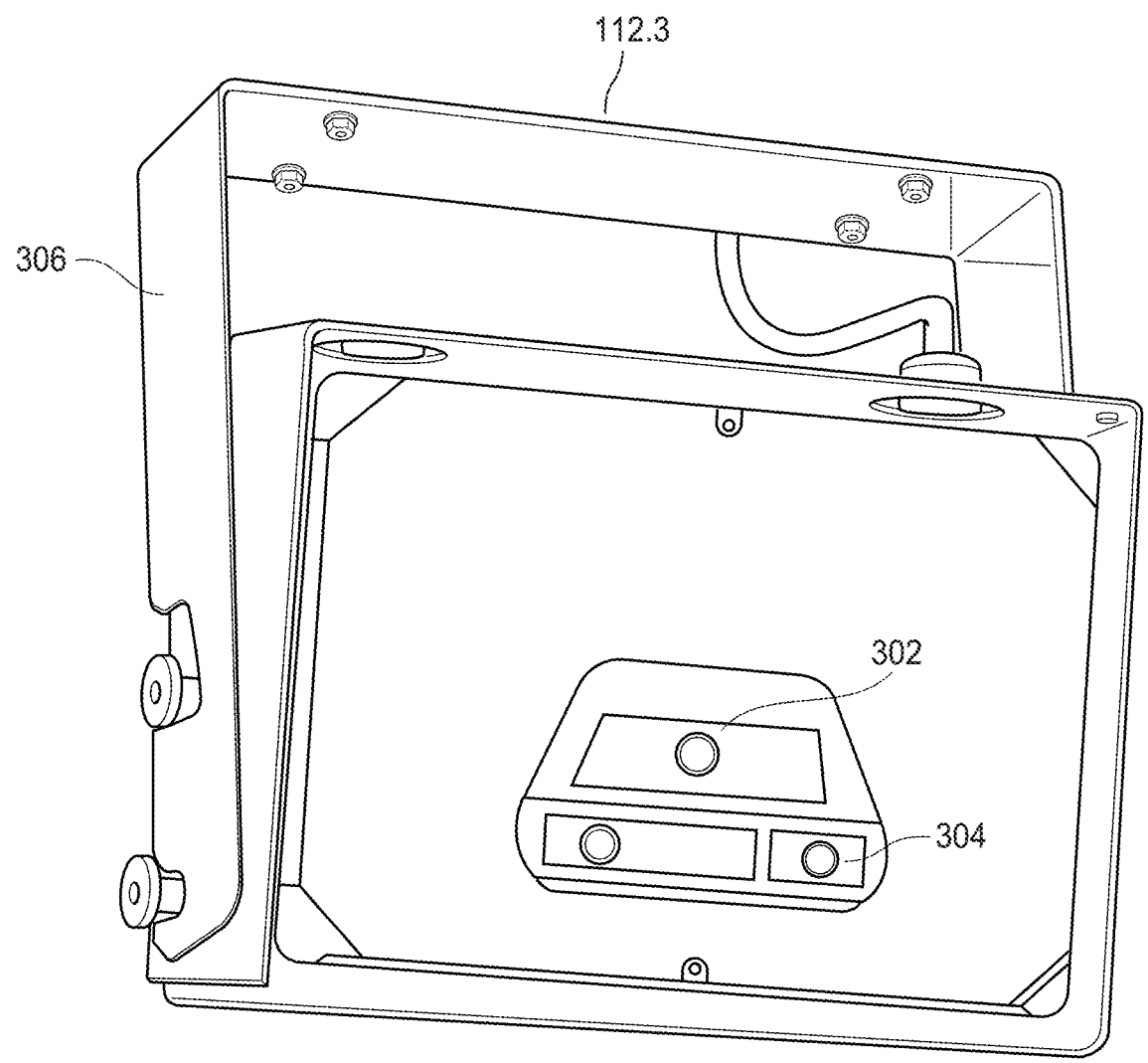
FIG. 3 illustrates a trailer monitoring unit (TMU), in accordance with an embodiment of the present invention.

In the currently described embodiment and as shown in FIG. 3, the TMU 112.3 is a mountable device that includes an imaging assembly 302 (referred to herein as a "3D-depth camera" or "3D depth sensor assembly") for capturing 3D (three dimensional) images (e.g., 3D image data comprised of a plurality of points with three-dimensional point data) and a 2D camera 304 for capturing 2D images (e.g., 2D image data). The 2D camera may be an RGB (red, green, blue) camera for capturing 2D images. TMU 112.3 may further include a network interface to enable communication with other devices (such as server 410). The network interface of TMU 112.3 may include any suitable type of communication interface(s) (e.g., wired and/or wireless interfaces) configured to operate in accordance with any suitable protocol(s). In various embodiments, and as shown in FIGS. 1 and 2, the TMU 112.3 is mounted via a mounting bracket 306 and oriented in the direction of docked trailers 102 to capture 3D and/or 2D image data of the interior and exterior thereof.

In an embodiment, to capture 3D image data, the 3D depth camera 302 includes an Infra-Red (R) projector and a related IR camera, and a depth-detection application executing on one or more processors or memories of the TMU 112.3.

Figure 4:
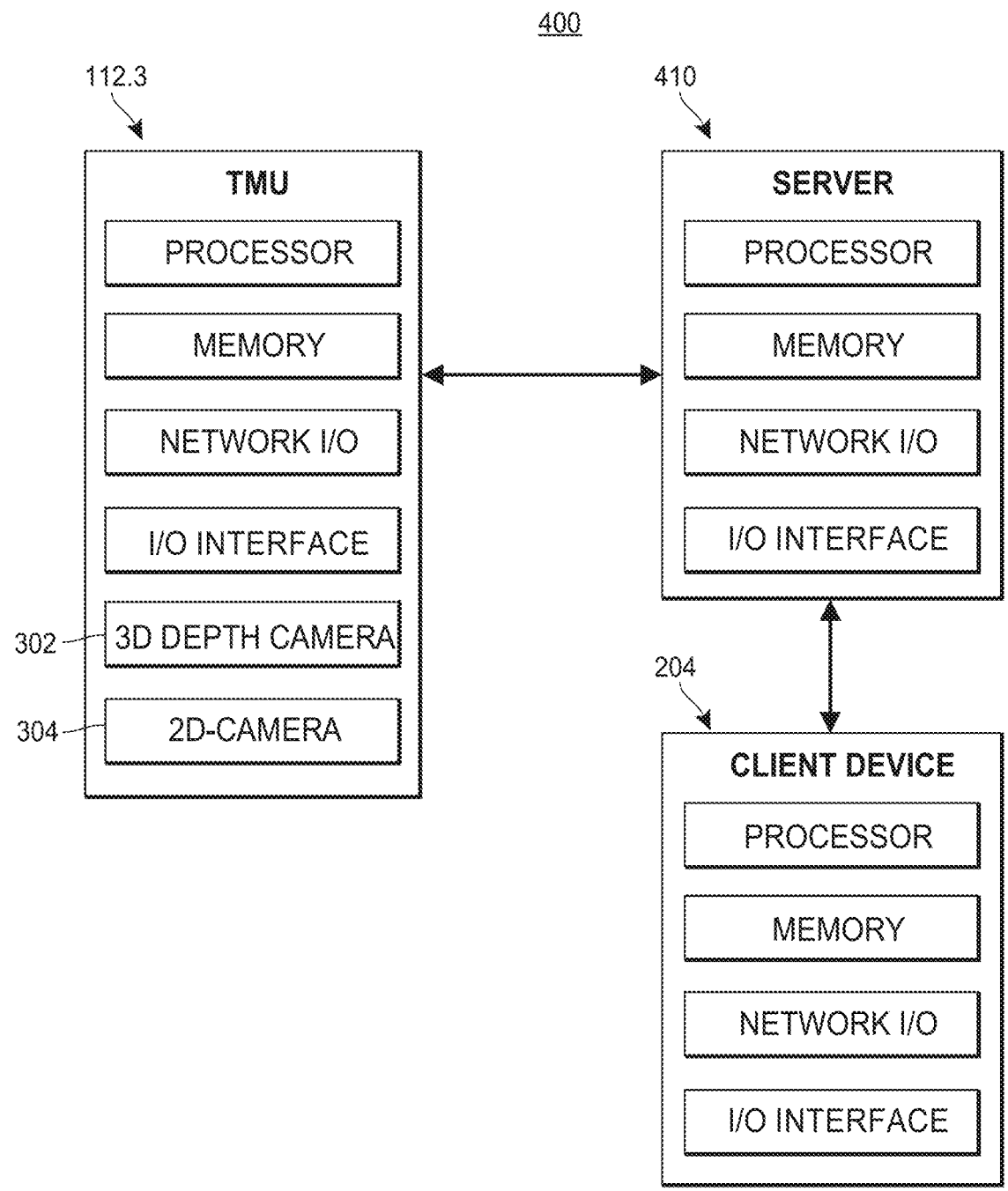
FIG. 4 illustrates a block diagram representative of an embodiment of a system, in accordance with an embodiment of the present invention.

FIG. 4 illustrates a block diagram representative of an embodiment of a system 400, in accordance with an embodiment of the present invention. The system 400 includes the TMU 112.3, the client device 204, and a server 410. In some embodiments, server 410 may be located in the same facility as loading facility 100 or implemented partially or fully in the TMU 112.3. In some embodiments, server 410 may be located at a remote location, such as on a cloud-platform or other remote location. In either embodiment, server 410 may be communicatively coupled to a 3D-depth camera (e.g., 3D depth camera 302).

Server 410 is configured to execute computer instructions to perform operations associated with the systems and methods as described herein, for example, implement the example operations represented by the block diagrams or flowcharts of the drawings accompanying this description. The server 410 may implement enterprise service software that may include, for example, RESTful (representational state transfer) API services, message queuing service, and event services that may be provided by various platforms or specifications, such as the J2EE specification implemented by any one of the Oracle WebLogic Server platform, the JBoss platform, or the IBM WebSphere platform, etc. Other technologies or platforms, such as Ruby on Rails, Microsoft .NET, or similar may also be used.

Figure 5A:
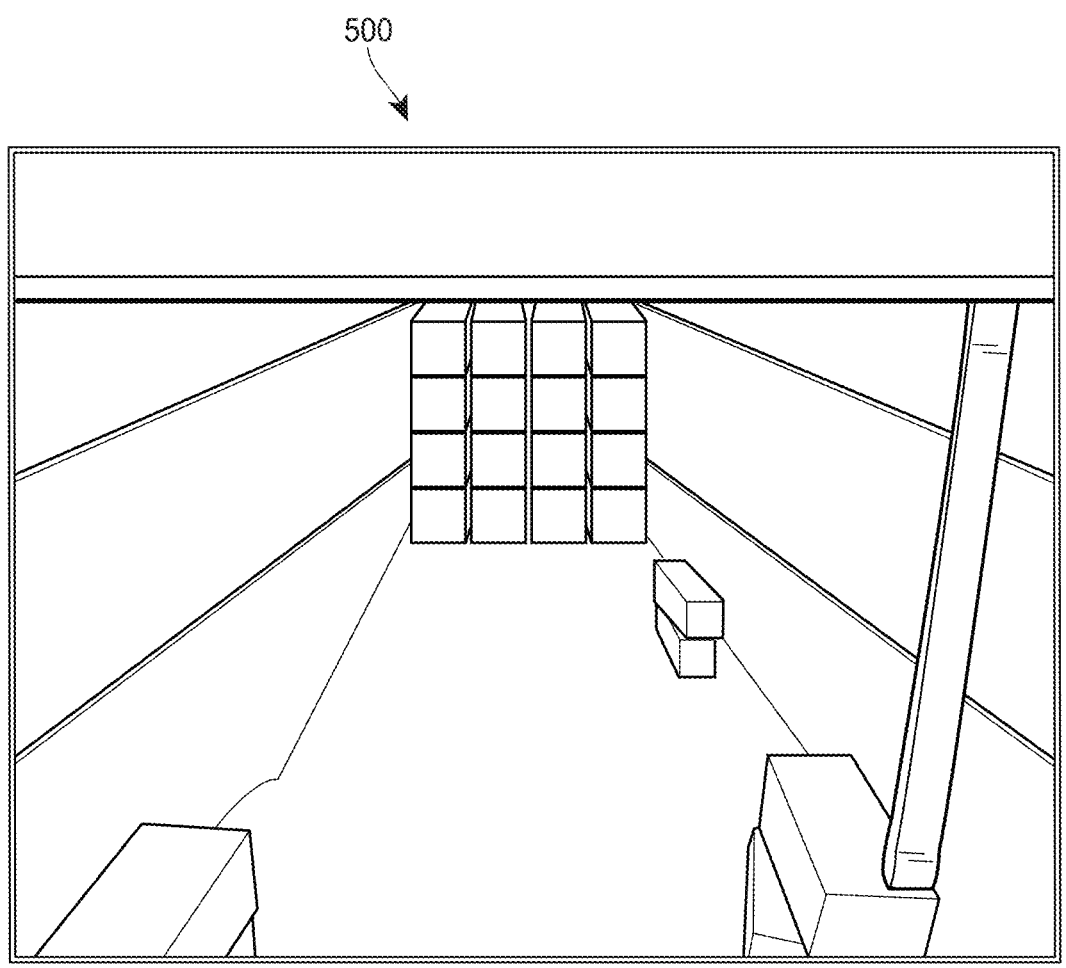
FIG. 5A is an image of an interior of the trailer 102 of FIG. 1 taken by the TMU 112.3 of FIG. 3, where a trailer door partially obscures the field of view (FOV) of the TMU 112.3.

FIG. 5A is an image of an interior of the trailer 102 of FIG. 1 taken by the TMU 112.3 of FIG. 3, where a trailer door 500 partially obscures the FOV of the TMU 112.3. For example, when a trailer 102 docks at the loading bay 106.3, the worker 212 may not fully raise the trailer door 500 such that it obscures at least a portion of the TMU's 112.3 FOV. Thus, when the 2D camera 304 captures an image of the interior of the trailer 102, the trailer door 500 will occupy a portion of the image corresponding to the portion of the TMU's 112.3 FOV the trailer door 500 obscured.

Figure 5B:
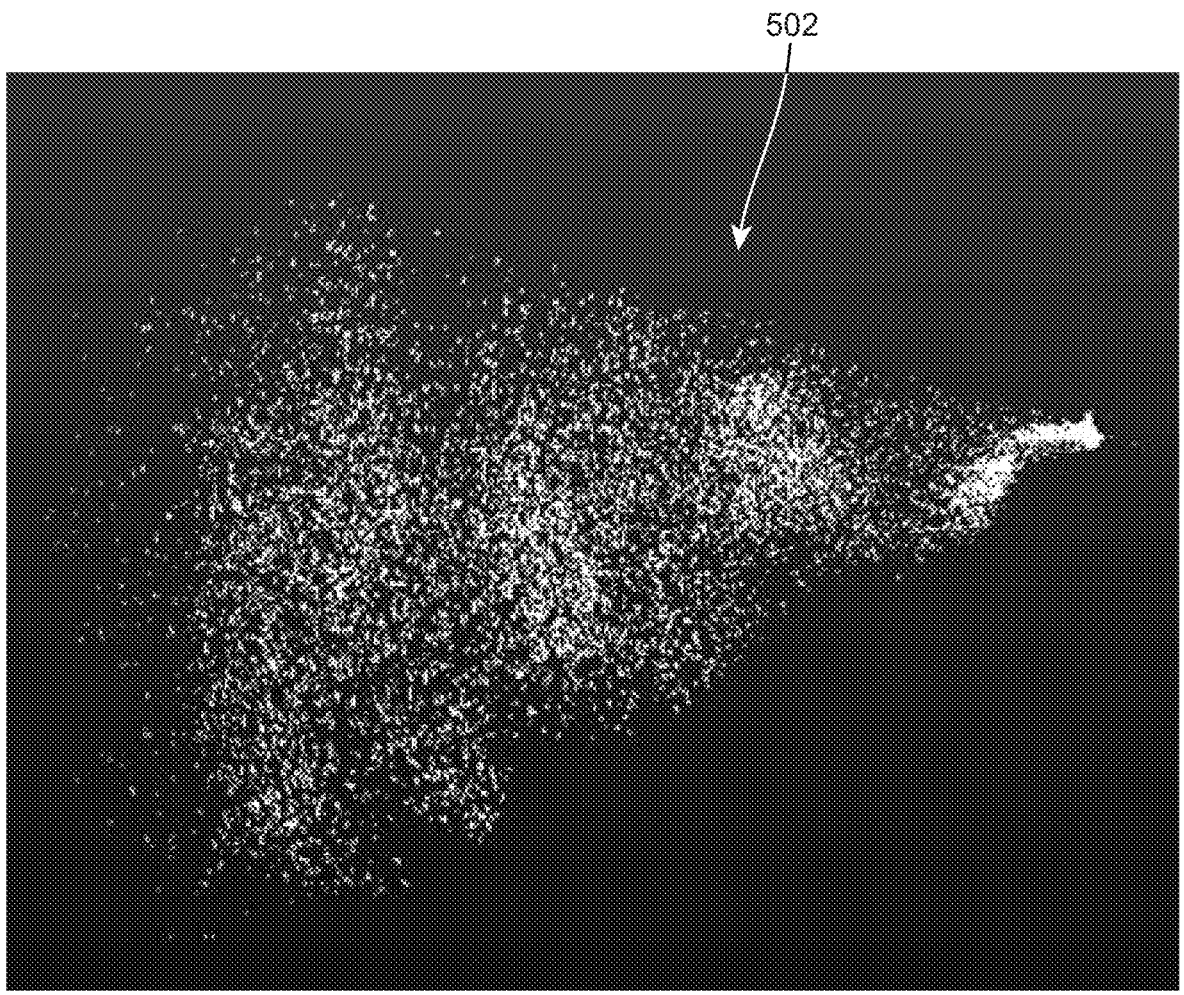
FIG. 5B is a plurality of three-dimensional (3D) point-cloud data obtained using a legacy auto-exposure algorithm and corresponding to the scene represented by the image of FIG. 5A from the point of view of the TMU 112.3.

FIG. 5B is a plurality of three-dimensional (3D) point-cloud data 502 obtained using a legacy auto-exposure algorithm (also referenced herein as a "traditional auto-exposure algorithm") and corresponding to the scene represented by the image of FIG. 5A from the point of view of the TMU 112.3. The plurality of 3D point-cloud data 502 represents the data captured by, for example, the 3D depth camera 302 of the TMU 112.3. The plurality of 3D point-cloud data 502 may be captured by the 3D depth camera 302, for example, before, during, or after the trailer 102 is loaded or unloaded. Moreover, the legacy auto-exposure algorithm may inadvertently prioritize a particular region of a scene (i.e., near-field, mid-field, far-field) based on signals detected by the 3D depth camera 302.

To illustrate, the 3D depth camera 302 may have captured the 3D point-cloud data 502 using a legacy auto-exposure algorithm. In this example, the legacy auto-exposure algorithm attempts to determine a single optimal exposure length for a particular scene to yield the highest image/data quality. However, in the situation represented by FIG. 5A, the trailer door 500 occupies an upper portion of the scene, and consequently, the near-field region relative to the 3D depth camera 302. When the auto-exposure algorithm determines the optimal exposure length, the presence of the trailer door 500 will lead the auto-exposure algorithm to prioritize the near-field region, and generate the 3D point-cloud data 502 accordingly. Thus, in this scenario, the near-field region of the depth field is overrepresented, leading to an oversaturation of the depth field and relative uselessness of the 3D point-cloud data 502.

Figure 5C:
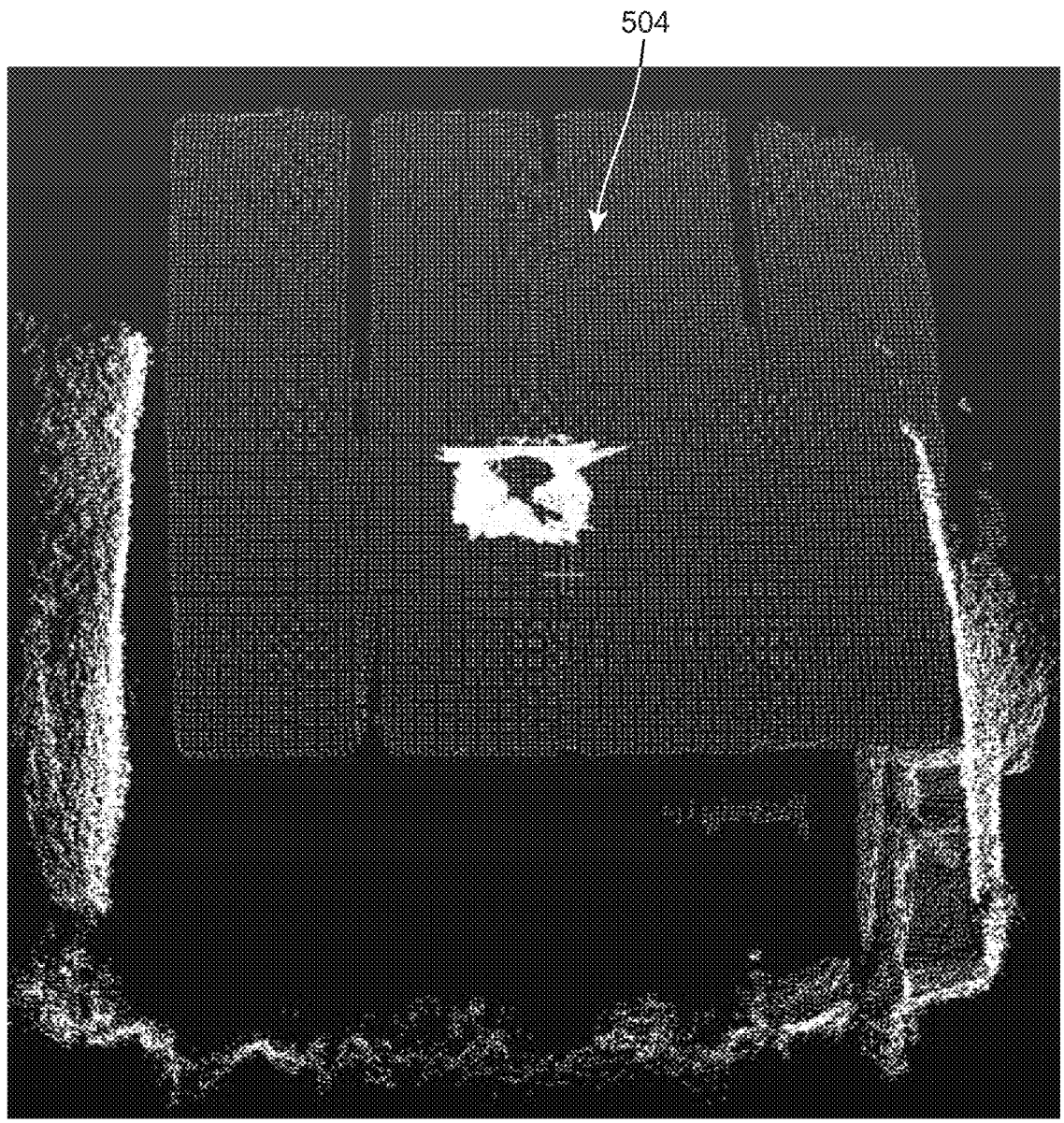
FIG. 5C is a plurality of 3D point-cloud data obtained in accordance with embodiments of the present invention and corresponding to the scene represented by the image of FIG. 5A from the point of view of the TMU 112.3.

FIG. 5C is a plurality of 3D point-cloud data 504 obtained in accordance with embodiments of the present invention and corresponding to the scene represented by the image of FIG. 5A from the point of view of the TMU 112.3. The plurality of 3D point-cloud data 504 represents the data captured by, for example, the 3D depth camera 302 of the TMU 112.3. The plurality of 3D point-cloud data 504 may represent, for example and as discussed herein, a combination of depth maps associated with varying exposure times. Moreover, the plurality of 3D point-cloud data 504 may be captured by the 3D depth camera 302, for example, before, during, or after the trailer 102 is loaded or unloaded.

Figure 6:
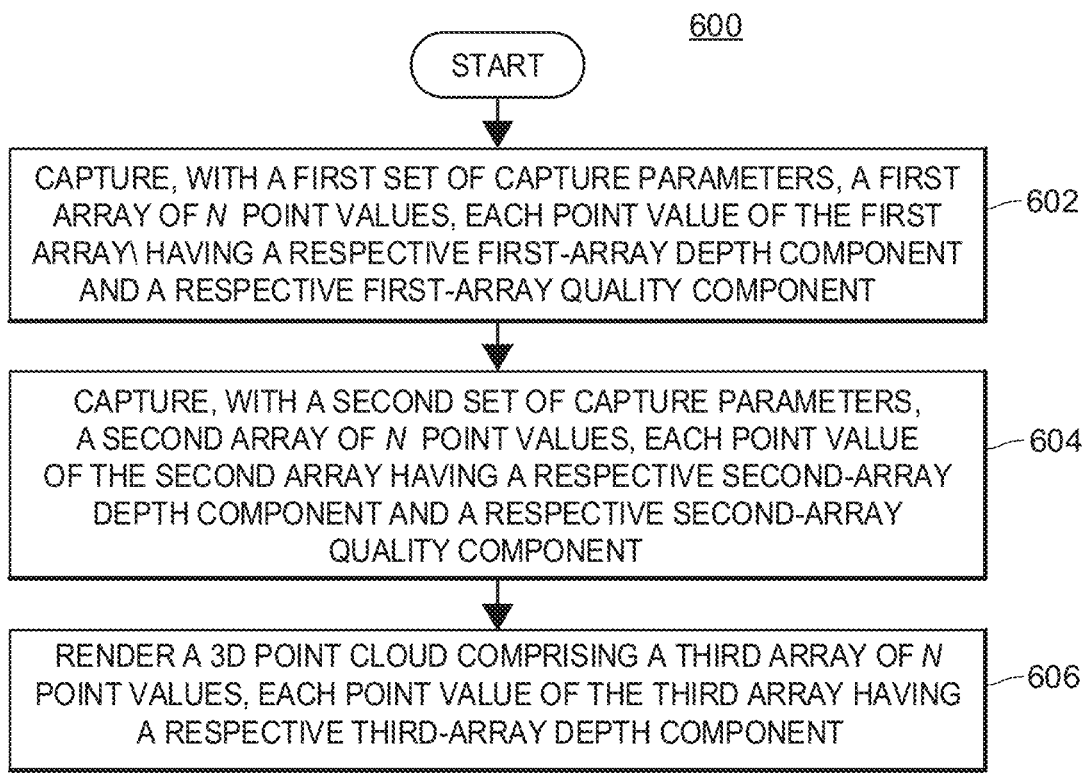
FIG. 6 illustrates an example method for performing robust depth calculations with ToF sensors using multiple exposure times, in accordance with various embodiments of the present invention.

FIG. 6 illustrates an example method 600 for performing robust depth calculations with ToF sensors using multiple exposure times, in accordance with various embodiments of the present invention. The method 600 begins at block 602 where, for example, a 3D depth sensor assembly (e.g., 3D depth camera 302) captures a first array of n point values. The 3D depth sensor assembly 302 is configured with a first set of capture-parameters, and each point value of the first array has a respective first-array depth component and a respective first-array quality component.

In various embodiments, the first set of capture-parameters corresponds to a first exposure duration. The first exposure duration may be optimized to allow the 3D depth sensor assembly 302 to capture the first array of n point values at a particular depth range. For example, the 3D depth sensor assembly 302 may capture the first array of n point values using a first exposure duration optimized for capturing near-field data. In other words, the first exposure duration may be shorter than the other exposure durations discussed herein (e.g., second exposure duration). However, it should be understood that the first exposure duration may be shorter or longer than any subsequent exposure durations used by the 3D depth sensor assembly 302.

Further in these embodiments, the respective first-array depth component of each of the n point values of the first array corresponds to captured depth data from within a first depth range based on the first exposure duration. The first exposure duration may be predetermined, or may be determined by the TMU 112.3 or other suitable device in real-time. As previously mentioned, the first exposure duration is optimized to allow the 3D depth sensor assembly 302 to capture the first array of n point values at a particular depth range (i.e., the first depth range). Thus, if the first depth range corresponds to the near-field (with respect to the 3D depth sensor assembly 302), a respective first-array depth component indicative of a near-field depth value may have a high corresponding respective first-array quality component. The high corresponding respective first-array quality component may indicate the accuracy of the respective first-array depth component, as discussed further herein.

In some embodiments, the respective first-array quality component for each of the n point values of the first array indicates a luminance of each respective n point value of the first array. To illustrate, the 3D depth sensor assembly 302 captures the first array of n point values by exposing the 3D depth sensors of the array 302 for a particular duration (i.e., the first exposure duration). Based on the exposure duration, the 3D depth sensor assembly 302 will detect and capture various amounts of light from surfaces (including each of the n point values of the first array) within the 3D depth sensor assembly's 302 FOV. The TMU 112.3, for example, uses the amount of light captured (i.e., luminance) for each of the n point values to calculate the respective first-array depth component. Thus, the luminance for each of the n point values indicates the quality of the resulting respective first-array depth component because it represents the reliability of the TMU's 112.3 depth calculation.

At block 604, the 3D depth sensor assembly 302 captures a second array of n point values. The 3D depth sensor assembly 302 is configured with a second set of capture-parameters, and each point value of the second array has a respective second-array depth component and a respective second-array quality component.

In various embodiments, the second set of capture-parameters corresponds to a second exposure duration. The second exposure duration is different from the first exposure duration, and may be optimized to allow the 3D depth sensor assembly 302 to capture the second array of n point values at a particular depth range. For example, the 3D depth sensor assembly 302 may capture the second array of n point values using a second exposure duration optimized for capturing far-field data. In other words, the second exposure duration may be longer than the other exposure durations discussed herein (e.g., first exposure duration). However, it should be understood that the second exposure duration may be shorter or longer than any subsequent exposure durations used by the 3D depth sensor assembly 302.

Further in these embodiments, the respective second-array depth component of each of the n point values of the second array corresponds to captured depth data from within a second depth range based on the second exposure duration. The second exposure duration may be predetermined, or may be determined by the TMU 112.3 or other suitable device in real-time. As previously mentioned, the second exposure duration is optimized to allow the 3D depth sensor assembly 302 to capture the second array of n point values at a particular depth range (i.e., the second depth range). Thus, if the second depth range corresponds to the far-field (with respect to the 3D depth sensor assembly 302), a respective second-array depth component indicative of a far-field depth value may have a high corresponding respective second-array quality component. The high corresponding respective second-array quality component may indicate the accuracy of the respective second-array depth component, as discussed further herein.

In some embodiments, the respective second-array quality component for each of the n point values of the second array indicates a luminance of each respective n point value of the second array. To illustrate, the 3D depth sensor assembly 302 captures the second array of n point values by exposing the 3D depth sensors of the array 302 for a particular duration (i.e., the second exposure duration). Based on the exposure duration, the 3D depth sensor assembly 302 will detect and capture various amounts of light from surfaces (including each of the n point values of the second array) within the 3D depth sensor assembly's 302 FOV. The TMU 112.3, for example, uses the amount of light captured (i.e., luminance) for each of the n point values to calculate the respective second-array depth component. Thus, the luminance for each of the n point values indicates the quality of the resulting respective second-array depth component because it represents the reliability of the TMU's 112.3 depth calculation.

At block 606, a processor (e.g., processor of the TMU 112.3) renders a 3D point cloud comprising a third array of n point values. Each point value of the third array has a respective third-array depth component. Here, n is an integer, and i is an integer ranging from 1 to n. For example, if the third array includes 10 point values, then n is equivalent to 10, and i ranges from 1 to 10. Moreover, for each $i^{th}$ point value of the third array, the respective third-array depth component is based on the respective first-array depth component of $i^{th}$ point value of the first array when the respective first-array quality component of the $i^{th}$ point value of the first array is within a predetermined quality threshold, and the respective third-array depth component is based on the respective second-array depth component of $i^{th}$ point value of the first array when the respective first-array quality component of the $i^{th}$ point value of the first array is not within a predetermined quality threshold. In certain embodiments, the predetermined quality threshold is indicative of a range of luminance values.

In other words, the TMU 112.3 renders the 3D point cloud comprising the third array of n point values by first evaluating the respective first-array quality component for the $i^{th}$ point value of the first array. In certain embodiments, if the respective first-array quality component of the $i^{th}$ point value of the first array is within a predetermined quality threshold, then the TMU 112.3 will set the respective third-array depth component of the $i^{th}$ point value of the third array as equivalent to the respective first-array depth component of the $i^{th}$ point value of the first array as. However, it should be understood that the TMU 112.3 may designate a value similar, but not equivalent, to the respective first-array depth component of the $i^{th}$ point value of the first array as the respective third-array depth component of the $i^{th}$ point value of the third array.

On the other hand, the TMU 112.3 may determine that the respective first-array quality component of the $i^{th}$ point value of the first array is not within the predetermined threshold. In this instance, the TMU 112.3 will set the respective third-array depth component of the $i^{th}$ point value of the third array as equivalent to the respective second-array depth component of the $i^{th}$ point value of the second array. However, it should be understood that the TMU 112.3 may designate a value similar, but not equivalent, to the respective second-array depth component of the $i^{th}$ point value of the second array as the respective third-array depth component of the $i^{th}$ point value of the third array.

To illustrate, the 3D depth sensor assembly 302 may capture a first and second array, both containing 10 point values. The TMU 112.3 may determine that the $1^{st}$ point value of the first array has a respective first-array quality component within the predetermined threshold, and an associated respective first-array depth component. Thus, the TMU 112.3 will designate the respective first-array depth component of the $1^{st}$ point value of the first array as the respective third-array depth component of the $1^{st}$ point value of the third array.

Alternatively, the 3D depth sensor assembly 302 may capture a first and second array, both containing 10 point values. The TMU 112.3 may determine that the $1^{st}$ point value of the first array has a respective first-array quality component not within the predetermined threshold, and an associated respective first-array depth component. Thus, the TMU 112.3 will designate the respective second-array depth component of the $1^{st}$ point value of the second array as the respective third-array depth component of the $1^{st}$ point value of the third array.

Figure 7:
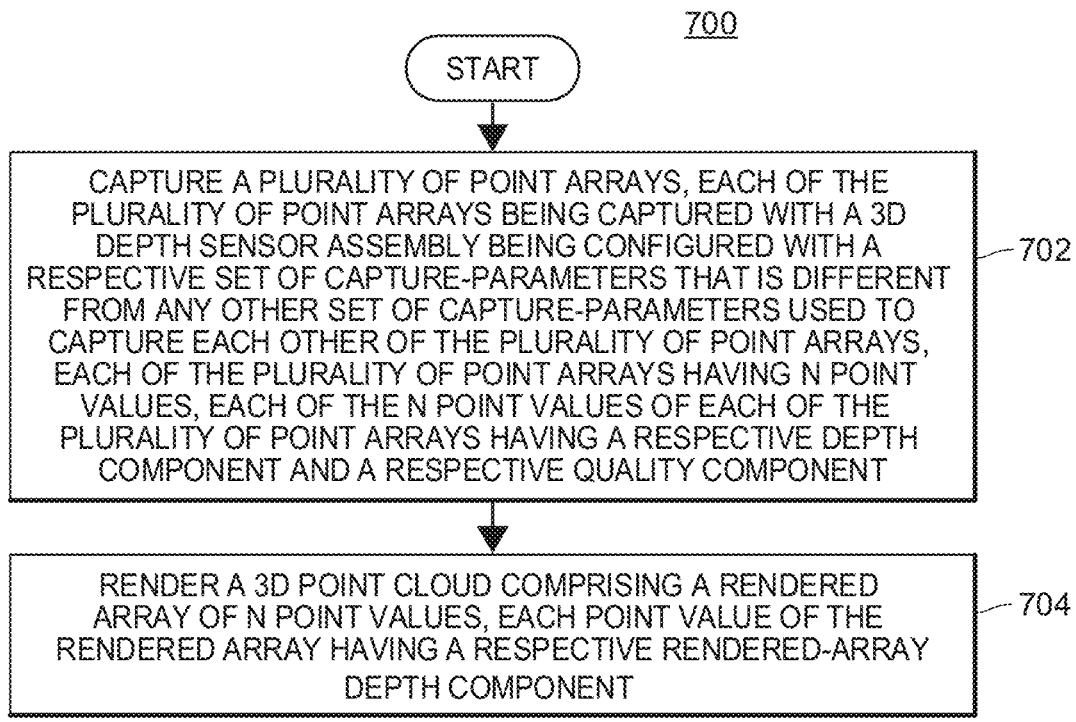
FIG. 7 illustrates another example method for performing robust depth calculations with ToF sensors using multiple exposure times, in accordance with various embodiments of the present invention.

FIG. 7 illustrates another example method 700 for performing robust depth calculations with ToF sensors using multiple exposure times, in accordance with various embodiments of the present invention. The method 700 begins at block 702, where, for example, the 3D depth sensor assembly 302 captures a plurality of point arrays. The 3D depth sensor assembly 302 captures each of the plurality of point arrays with a respective set of capture-parameters that is different from any other set of capture-parameters used to capture each other of the plurality of point arrays. Moreover, each of the plurality of point arrays includes n point values, and each of the n point values of each of the plurality of point arrays has a respective depth component and a respective quality component.

In various embodiments, each set of capture-parameters corresponds to a respective exposure duration. Each respective exposure duration may be optimized to allow the 3D depth sensor assembly 302 to capture the respective array of n point values at a particular depth range. For example, the 3D depth sensor assembly 302 may capture a first array of n point values using a first exposure duration optimized for capturing near-field data. In other words, the first exposure duration may be shorter than the other respective exposure durations discussed herein (e.g., a second exposure duration, a third exposure duration, etc.). However, it should be understood that any respective exposure duration may be shorter or longer than any other respective exposure duration used by the 3D depth sensor assembly 302.

Further in these embodiments, the respective depth component of each of the n point values of each point array of the plurality of point arrays corresponds to captured depth data from within a respective depth range based on the respective exposure duration. The respective exposure duration may be predetermined, or may be determined by the TMU 112.3 or other suitable device in real-time. As previously mentioned, the respective exposure duration is optimized to allow the 3D depth sensor assembly 302 to capture the respective array of n point values at a particular depth range (i.e., the respective depth range). Thus, if the respective depth range corresponds to the near-field (with respect to the 3D depth sensor assembly 302), a respective depth component indicative of a near-field depth value may have a high corresponding respective quality component. The high corresponding respective quality component may indicate the accuracy of the respective depth component, as discussed further herein.

In some embodiments, the respective quality component for each of the n point values of each point array of the plurality of point arrays indicates a luminance of each respective n point value of the respective array. To illustrate, the 3D depth sensor assembly 302 captures a respective array of n point values by exposing the 3D depth sensors of the array 302 for a particular duration (i.e., a respective exposure duration). Based on the respective exposure duration, the 3D depth sensor assembly 302 will detect and capture various amounts of light from surfaces (including each of the n point values of the respective array) within the 3D depth sensor assembly's 302 FOV. The TMU 112.3, for example, uses the amount of light captured (i.e., luminance) for each of the n point values to calculate the respective depth component. Thus, the luminance for each of the n point values of each point array of the plurality of point arrays indicates the quality of the resulting respective depth component because it represents the reliability of the TMU's 112.3 depth calculation.

At block 704, a processor (e.g., processor of the TMU 112.3) renders a 3D point cloud comprising a rendered array of n point values. Each point value of the rendered array has a respective rendered-array depth component. Here, n is an integer, and i is an integer ranging from 1 to n. For example, if the third array includes 10 point values, then n is equivalent to 10, and i ranges from 1 to 10.

Moreover, for each $i^{th}$ point value of the rendered array, the operation of rendering the 3D point cloud includes: (a) determining if the respective quality component of $i^{th}$ point value of one of the plurality of point arrays is within a predetermined quality threshold; (b) responsive to the respective quality component of the $i^{th}$ point value of the one of the plurality of point arrays being within the predetermined quality threshold, basing the respective rendered-array depth component on the respective depth component of the $i^{th}$ point value of the one of the plurality of point arrays; and (c) responsive to the respective quality component of the $i^{th}$ point value of the one of the plurality of point arrays being outside the predetermined quality threshold, repeating steps (a)-(c) such that the one of the plurality of point arrays is replaced with another one of the plurality of point arrays. In certain embodiments, the predetermined quality threshold is indicative of a range of luminance values.

To illustrate, the 3D depth sensor assembly 302 may capture 4 point arrays, each one including 10 point values and respective depth and quality components for each point value. In this case, the first of the 4 point arrays may have a $1^{st}$ point value with a respective quality component within a predetermined quality threshold. The TMU 112.3 may then render a 3D point cloud by, in part, basing the respective rendered-array depth component of the $1^{st}$ point value of the rendered 3D point cloud on the respective depth component of the $1^{st}$ point value of the first point array.

However, in another example, the first of the 4 point arrays may have a $1^{st}$ point value with a respective quality component not within the predetermined quality threshold. Indeed, in this scenario, the fourth point array is the only one of the 4 point arrays with a $1^{st}$ point value with a respective quality components within the predetermined quality threshold. Thus, the TMU 112.3 would render the 3D point cloud by, in part, (a) determining that the respective quality component of the $1^{st}$ point value of the first point array is not within the predetermined quality threshold, (b) replacing the first point array with the second point array, (c) determining that the respective quality component of the $1^{st}$ point value of the second point array is not within the predetermined quality threshold, (d) replacing the second point array with the third point array, (e) determining that the respective quality component of the $1^{st}$ point value of the third point array is not within the predetermined quality threshold, (f) replacing the third point array with the fourth point array, (g) determining that the respective quality component of the $1^{st}$ point value of the fourth point array is within the predetermined quality threshold, and (h) basing the respective rendered-array depth component of the $1^{st}$ point value of the rendered 3D point cloud on the respective depth component of the $1^{st}$ point value of the fourth point array.

In certain embodiments, basing the respective rendered-array depth component on the respective depth component of the $i^{th}$ point value of the one of the plurality of point arrays includes setting equal the respective rendered-array depth component to the respective depth component of the $i^{th}$ point value of the one of the plurality of point arrays.

To illustrate, and in reference to the above example, the TMU 112.3 may base the respective rendered-array depth component of the $1^{st}$ point value of the rendered 3D point cloud on the respective depth component of the $1^{st}$ point value of the fourth point array by setting equal the respective rendered-array depth component to the respective depth component of the $1^{st}$ point value of the fourth point array. However, it should be understood that the TMU 112.3 may base the respective rendered-array depth component of the $1^{st}$ point value of the rendered 3D point cloud on the respective depth component of the $1^{st}$ point value of the fourth point array by setting the respective rendered-array depth component of the $1^{st}$ point value of the rendered 3D point cloud to a value similar, but not equivalent, to the respective depth component of the $1^{st}$ point value of the fourth point array.

Further in this example, after step (h), the TMU 112.3 may further render the 3D point cloud in several ways. For example, the TMU 112.3 may proceed to the $2^{nd}$ point value of the rendered 3D point cloud, and evaluate the respective quality components of the $2^{nd}$ point value for each of the 4 point arrays, in a manner similar to that described above. However, the TMU 112.3 may begin the evaluation process with a different point array than the one used in the previous iteration. In other words, while the TMU 112.3 began the evaluation process for the $1^{st}$ point value of the rendered 3D point cloud by evaluating the respective quality component of the $1^{st}$ point value of the first point array, the TMU 112.3 may begin the evaluation process for the $2^{nd}$ point value of the rendered 3D point cloud by evaluating the respective quality component of the $2^{nd}$ point value of the fourth point array.

Accordingly, the TMU 112.3 may begin and/or continue the rendering process with respect to each $i^{th}$ point value in the rendered 3D point cloud by first evaluating the respective quality component of the $i^{th}$ point value of any of the captured plurality of point arrays (i.e., the TMU 112.3 may examine the respective quality components of the plurality of point arrays in any order, such as: (1) fourth point array, (2) second point array, (3) third point array, (4) first point array; or any other suitable order).

In certain embodiments, for each $i^{th}$ point value of the rendered array, the operation of rendering the 3D point cloud further includes (d) responsive to the respective quality component of the $i^{th}$ point value of the each of the plurality of point arrays being outside the predetermined quality threshold, basing the respective rendered-array depth component on a plurality of the respective depth components of the $i^{th}$ point values of at least some of the plurality of point arrays. In some of these embodiments, basing the respective rendered-array depth component on the plurality of the respective depth components of the $i^{th}$ point values of at least some of the plurality of point arrays includes basing the respective rendered-array depth component on at least one of (i) an average of the plurality of the respective depth components of the $i^{th}$ point values of at least some of the plurality of point arrays, (ii) a weighted average of the plurality of the respective depth components of the $i^{th}$ point values of at least some of the plurality of point arrays, and (iii) a median of the plurality of the respective depth components of the $i^{th}$ point values of at least some of the plurality of point arrays For example, if the 3D depth sensor assembly 302 captures four point arrays, and the respective quality component of the $1^{st}$ point value of each of the four point arrays is outside the predetermined quality threshold, the TMU 112.3 may base the respective rendered-array depth component on the respective depth components of the $1^{st}$ point values of the first and third point arrays. Further in this example, the TMU 112.3 may base the respective rendered-array depth component on the respective depth components of the 1st point values of the first, third, and fourth point arrays, or any other combination of the four point arrays.

Additionally, as mentioned above, basing the respective rendered-array depth component on the respective depth components of the 1st point values of the first, third, and fourth point arrays may include basing the respective rendered-array depth component on the (i) average of the respective depth components of the $1^{st}$ point values of the first, third, and fourth point arrays, (ii) weighted average of the respective depth components of the $1^{st}$ point values of the first, third, and fourth point arrays, and/or (iii) median of the respective depth components of the $1^{st}$ point values of the first, third, and fourth point arrays.

In some embodiments, for each $i^{th}$ point value of the rendered array, the operation of rendering the 3D point cloud further includes (d) responsive to the respective quality component of the $i^{th}$ point value of the each of the plurality of point arrays being outside the predetermined quality threshold, basing the respective rendered-array depth component on the respective depth component of the $i^{th}$ point value of a point array having the respective quality component of the $i^{th}$ point value deviate the least from the predetermined quality threshold relative to any other point array of the plurality of point arrays.

For example, if the 3D depth sensor assembly 302 captures four point arrays, and the respective quality component of the $1^{st}$ point value of each of the four point arrays is outside the predetermined quality threshold, the TMU 112.3 may base the respective rendered-array depth component on the respective depth component of the $1^{st}$ point value of the third point array because it deviates the least from a predetermined quality threshold.

Figure 8:
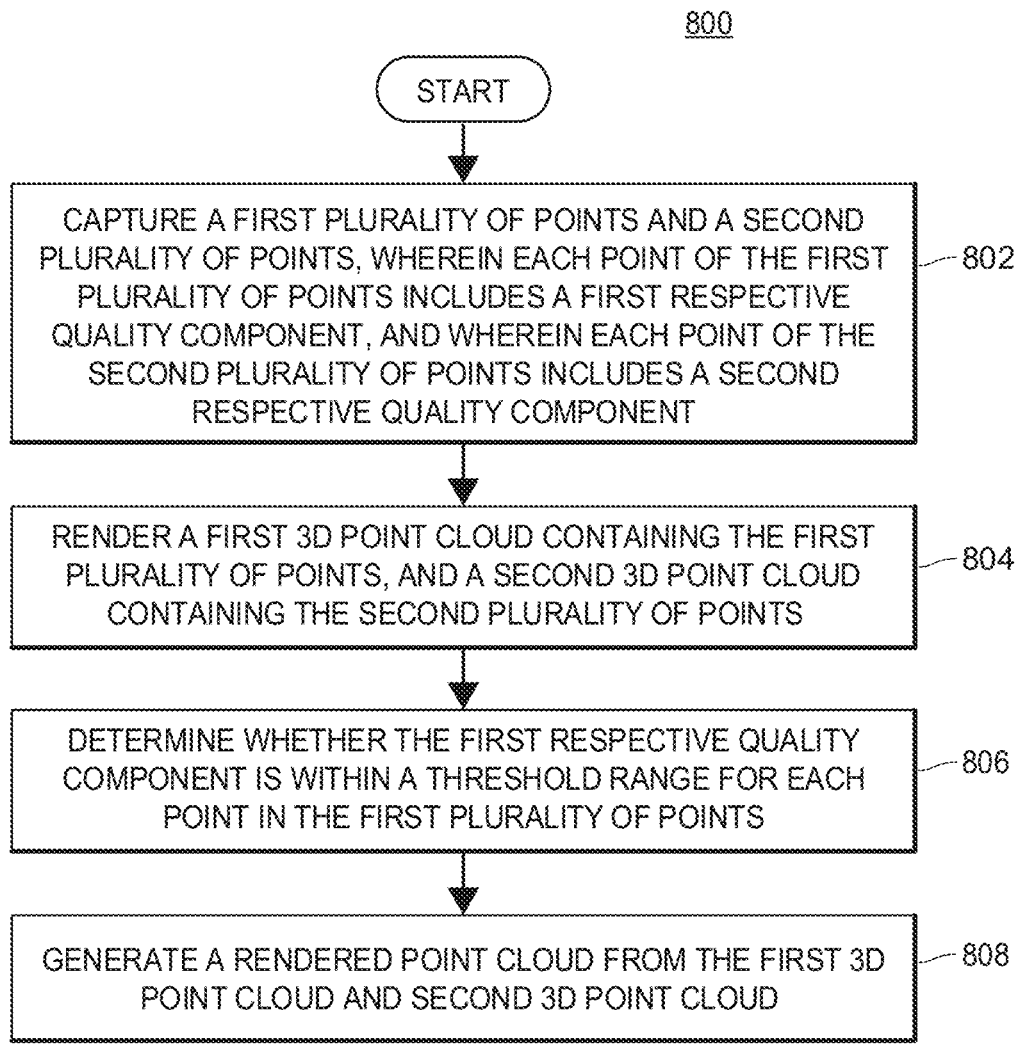
FIG. 8 illustrates yet another example method for performing robust depth calculations with ToF sensors using multiple exposure times, in accordance with various embodiments of the present invention.

FIG. 8 illustrates yet another example method 800 for performing robust depth calculations with ToF sensors using multiple exposure times, in accordance with various embodiments of the present invention. The method 800 begins at block 802, where, for example, the 3D depth sensor assembly 302 captures a first plurality of points and a second plurality of points. Each point of the first plurality of points includes a first respective quality component and a first respective depth component, and each point of the second plurality of points includes a second respective quality component and a second respective depth component.

In certain embodiments, the 3D depth sensor assembly 302 captures the first plurality of points using a first exposure duration. Moreover, the 3D depth sensor assembly 302 captures the second plurality of points using a second exposure duration that is different from the first exposure duration. For example, the 3D depth sensor assembly 302 may capture the first plurality of points using the first exposure duration, where the first exposure duration is optimized for capturing far-field data. In other words, the first exposure duration may be longer than the other exposure durations discussed herein (e.g., the second exposure duration). However, it should be understood that the first exposure duration may be shorter or longer than any subsequent exposure durations used by the 3D depth sensor assembly 302.

Further in these embodiments, the first respective depth component of each point in the first plurality of points corresponds to captured depth data from within a first depth range based on the first exposure duration, and the second respective depth component of each point in the second plurality of points corresponds to captured depth data from within a second depth range based on the second exposure duration. For example, if the first depth range corresponds to the near-field (with respect to the 3D depth sensor assembly 302), a first respective depth component indicative of a near-field depth value may have a high corresponding first respective quality component. The high corresponding first respective quality component may indicate the accuracy of the first respective depth component, as discussed further herein. Additionally, either or both of the first exposure duration and the second exposure duration may be predetermined, or may be determined by the TMU 112.3 or other suitable device in real-time.

In some embodiments, the first respective quality component of each point in the first plurality of points indicates a luminance of each respective point in the first plurality of points, and the second respective quality component of each point in the second plurality of points indicates a luminance of each respective point in the second plurality of points. To illustrate, the 3D depth sensor assembly 302 captures the first plurality of points by exposing the 3D depth sensors of the array 302 for a particular duration (i.e., the first exposure duration). Based on the exposure duration, the 3D depth sensor assembly 302 will detect and capture various amounts of light from surfaces (including each point in the first plurality of points) within the 3D depth sensor assembly's 302 FOV. The TMU 112.3, for example, uses the amount of light captured (i.e., luminance) for each point in the first plurality of points to calculate the first respective depth component. Thus, the luminance for each point in the first plurality of points indicates the quality of the resulting first respective depth component because it represents the reliability of the TMU's 112.3 depth calculation.

At block 804, the TMU 112.3 renders a first 3D point cloud containing the first plurality of points, and a second 3D point cloud containing the second plurality of points.

At block 806, the TMU 112.3 determines whether the first respective quality component is within a threshold range for each point in the first plurality of points. In certain embodiments, the threshold range is indicative of a range of luminance values.

At block 808, the TMU 112.3 generates a rendered point cloud from the first 3D point cloud and the second 3D point cloud. The TMU 112.3 generates the rendered point cloud by at least for each first respective point in the first plurality of points, storing the first respective point in the rendered point cloud if the first respective quality component is within the threshold range; and for each second respective point in the second plurality of points corresponding to the first respective point in the first plurality of points, storing the second respective point in the rendered point cloud if the first respective quality component associated with the first respective point is not within the threshold range.

For example, the TMU 112.3 will generate the rendered point cloud by checking the first respective quality component of the first respective point in the first plurality of points. If the TMU 112.3 determines the first respective quality component is within the threshold range, the TMU 112.3 will update the rendered point cloud by storing the first respective point from the first plurality of points into the rendered point cloud. Alternatively, if the TMU 112.3 determines the first respective quality component is not within the threshold range, the TMU 112.3 will update the rendered point cloud by storing the second respective point in the rendered point cloud. The TMU 112.3 may update the rendered point cloud by storing the second respective point in the rendered point cloud when the first respective quality component is not within the threshold range by default, or the TMU 112.3 may additionally check the second respective quality component of the second respective point before storing the second respective point in the rendered point cloud.

In various embodiments, the analysis of block 808 may be performed by a backend server, for example, the server 410 of FIG. 4. It should be understood that the analysis and actions of blocks 604, 606, 704, 804, and 806 may also be performed by a backend server, for example, the server 410 of FIG. 4.

The terms transmitter, receiver, and transceiver are used herein for example purposes and should not be construed as limiting. For example, it will be understand that references to an element being a transmitter or a receiver include that element being a transceiver. Furthermore, any reference to an element being a transceiver may include that element being implemented as a transmitter and/or receiver depending on whether the element is sending and/or receiving data.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for performing depth calculations using three-dimensional (3D) depth sensors, comprising:
   capturing, by a 3D depth sensor assembly, configured with a first set of capture-parameters, a first array of n point values, each point value of the first array having a respective first-array depth component and a respective first-array quality component;
   capturing, by the 3D depth sensor assembly, configured with a second set of capture-parameters, a second array of n point values, each point value of the second array having a respective second-array depth component and a respective second-array quality component; and
   rendering, by a processor, a 3D point cloud comprising a third array of n point values, each point value of the third array having a respective third-array depth component,
   wherein n is an integer,
   wherein i is an integer ranging from 1 to n, and
   wherein, for each $i^{th}$ point value of the third array, the respective third-array depth component is based on the respective first-array depth component of $i^{th}$ point value of the first array when the respective first-array quality component of the $i^{th}$ point value of the first array is within a predetermined quality threshold, and the respective third-array depth component is based on the respective second-array depth component of $i^{th}$ point value of the second array when the respective first-array quality component of the $i^{th}$ point value of the first array is not within a predetermined quality threshold, wherein:
   the first set of capture-parameters corresponds to a first exposure duration;
   the second set of capture-parameters corresponds to a second exposure duration that is different from the first exposure duration;
   the respective first-array depth component of each of the n point values of the first array corresponds to captured depth data from within a first depth range based on the first exposure duration; and
   the respective second-array depth component of each of the n point values of the second array corresponds to captured depth data from within a second depth range based on the second exposure duration.

2. The method of claim 1, wherein:
   the respective first-array quality component for each of the n point values of the first array indicates a luminance of each respective n point value of the first array;
   the respective second-array quality component for each of the n point values of the second array indicates a luminance of each respective n point value of the second array; and
   the predetermined quality threshold is indicative of a range of luminance values.

3. The method of claim 1, wherein basing the respective third-array depth component on the respective first-array depth component or the second-array depth component includes setting equal the respective third-array depth component to the respective first-array depth component or the second-array depth component.

4. A method for performing depth calculations using three-dimensional (3D) depth sensors, comprising:
   capturing, by a 3D depth sensor assembly, a plurality of point arrays, each of the plurality of point arrays being captured with the 3D depth sensor assembly being configured with a respective set of capture-parameters that is different from any other set of capture-parameters used to capture each other of the plurality of point arrays, each of the plurality of point arrays having n point values, each of the n point values of each of the plurality of point arrays having a respective depth component and a respective quality component; and
   rendering, by a processor, a 3D point cloud comprising a rendered array of n point values, each point value of the rendered array having a respective rendered-array depth component,
   wherein n is an integer,
   wherein i is an integer ranging from 1 to n, and
   wherein, for each $i^{th}$ point value of the rendered array, the operation of rendering the 3D point cloud includes:
   (a) determining if the respective quality component of $i^{th}$ point value of one of the plurality of point arrays is within a predetermined quality threshold;
   (b) responsive to the respective quality component of the $i^{th}$ point value of the one of the plurality of point arrays being within the predetermined quality threshold, basing the respective rendered-array depth component on the respective depth component of the $i^{th}$ point value of the one of the plurality of point arrays; and
   (c) responsive to the respective quality component of the $i^{th}$ point value of the one of the plurality of point arrays being outside the predetermined quality threshold, repeating steps (a)-(c) such that the one of the plurality of point arrays is replaced with another one of the plurality of point arrays wherein, for each $i^{th}$ point value of the rendered array, the operation of rendering the 3D point cloud further includes:

(d) responsive to the respective quality component of the $i^{th}$ point value of the each of the plurality of point arrays being outside the predetermined quality threshold, basing the respective rendered-array depth component on the respective depth component of the $i^{th}$ point value of a point array having the respective quality component of the $i^{th}$ point value deviate the least from the predetermined quality threshold relative to any other point array of the plurality of point arrays.

5. The method of claim 4, wherein:

each respective set of capture-parameters corresponds to a respective exposure duration; and for each point array of the plurality of point arrays, the respective depth component of each of the n point values corresponds to captured depth data from within a respective depth range based on the respective exposure duration.

6. The method of claim 4, wherein:

for each point array of the plurality of point arrays, the respective quality component of each of the n point values indicates a luminance of each respective n point value; and the predetermined quality threshold is indicative of a range of luminance values.

7. The method of claim 4, wherein basing the respective rendered-array depth component on the respective depth component of the $i^{th}$ point value of the one of the plurality of point arrays includes setting equal the respective rendered-array depth component to the respective depth component of the $i^{th}$ point value of the one of the plurality of point arrays.

8. A method for performing depth calculations using three-dimensional (3D) depth sensors, comprising:

capturing, by a 3D depth sensor assembly, a first plurality of points and a second plurality of points, wherein each point of the first plurality of points includes a first respective quality component and a first respective depth component, and wherein each point of the second plurality of points includes a second respective quality component and a second respective depth component;

rendering, by one or more processors, a first 3D point cloud containing the first plurality of points, and a second 3D point cloud containing the second plurality of points;

determining, by the one or more processors, whether the first respective quality component is within a threshold range for each point in the first plurality of points; and generating, by the one or more processors, a rendered point cloud from the first 3D point cloud and second 3D point cloud by at least:

for each first respective point in the first plurality of points, storing, by the one or more processors, the first respective point in the rendered point cloud if the first respective quality component is within the threshold range; and for each second respective point in the second plurality of points corresponding to the first respective point in the first plurality of points, storing, by the one or more processors, the second respective point in the rendered point cloud if the first respective quality component associated with the first respective point is not within the threshold range, wherein:

the 3D depth sensor assembly captures the first plurality of points using a first exposure duration;

the 3D depth sensor assembly captures the second plurality of points using a second exposure duration that is different from the first exposure duration;

the first respective depth component of each point in the first plurality of points corresponds to captured depth data from within a first depth range based on the first exposure duration; and the second respective depth component of each point in the second plurality of points corresponds to captured depth data from within a second depth range based on the second exposure duration.

9. The method of claim 8, wherein:

the first respective quality component of each point in the first plurality of points indicates a luminance of each respective point in the first plurality of points;

the second respective quality component of each point in the second plurality of points indicates a luminance of each respective point in the second plurality of points; and the threshold range is indicative of a range of luminance values.

10. A system for performing robust depth calculations, comprising:

a user interface;

a trailer monitoring unit (TMU) mounted proximate a loading bay and communicatively connected with the user interface, the TMU including:

a housing; and a three-dimensional (3D) depth sensor assembly at least partially within the housing and configured to capture a first plurality of points and a second plurality of points, wherein each point of the first plurality of points includes a first respective quality component and a first respective depth component, and wherein each point of the second plurality of points includes a second respective quality component and a second respective depth component;

wherein the TMU is configured to:

render a first 3D point cloud containing the first plurality of points, and a second 3D point cloud containing the second plurality of points;

determine whether the first respective quality component is within a threshold range for each point in the first plurality of points; and generate a rendered point cloud from the first 3D point cloud and second 3D point cloud by at least:

for each first respective point in the first plurality of points, store, by the one or more processors, the first respective point in the rendered point cloud if the first respective quality component is within the threshold range; and for each second respective point in the second plurality of points corresponding to the first respective point in the first plurality of points, store, by the one or more processors, the second respective point in the rendered point cloud if the first respective quality component associated with the first respective point is outside the threshold range, wherein:

the 3D depth sensor assembly captures the first 3D point cloud using a first exposure duration;

the 3D depth sensor assembly captures the second 3D point cloud using a second exposure duration that is different from the first exposure duration:
the first respective depth component of each point in the first plurality of points corresponds to captured depth data from within a first depth range based on the first exposure duration; and
the second respective depth component of each point in the second plurality of points corresponds to captured depth data from within a second depth range based on the second exposure duration.

11. The system of claim 10, wherein:
the first respective quality component of each point in the first plurality of points indicates a luminance of each respective point in the first plurality of points;
the second respective quality component of each point in the second plurality of points indicates a luminance of each respective point in the second plurality of points; and
the threshold range is indicative of a range of luminance values.

\* \* \* \* \*